US012640300B2

United States Patent
(12) United States Patent
Kim et al.

(10) Patent No.: US 12,640,300 B2
(45) Date of Patent: May 26, 2026

(54) ELECTRONIC COMPONENT AND MANUFACTURING METHOD THEREFOR

(71) Applicant: MODA-INNOCHIPS CO., LTD., Ansan-Si (KR)

(72) Inventors: Gyeong Tae Kim, Ansan-Si (KR); Tae Geun Seo, Osan-Si (KR); Sang Hoon Shin, Daegu (KR); Jin Su Jeong, Ansan-Si (KR)

(73) Assignee: MODA-INNOCHIPS CO., LTD. (KR)

( * ) Notice: Subject to any disclaimer, the term of this patent is extended or adjusted under 35 U.S.C. 154(b) by 1073 days.

(21) Appl. No.: 17/770,287

(22) PCT Filed: Aug. 20, 2021

(86) PCT No.: PCT/KR2021/011154
§ 371 (c)(1),
(2) Date: Apr. 19, 2022

(87) PCT Pub. No.: WO2022/045686
PCT Pub. Date: Mar. 3, 2022

(65) Prior Publication Data
US 2022/0392690 A1 Dec. 8, 2022

(30) Foreign Application Priority Data
Aug. 28, 2020 (KR) ........................ 10-2020-0109522

(51) Int. Cl.
*H01F 27/28* (2006.01)
*H01F 27/02* (2006.01)
(Continued)

(52) U.S. Cl.
CPC ......... *H01F 27/2804* (2013.01); *H01F 27/02* (2013.01); *H01F 27/292* (2013.01); *H01F 41/04* (2013.01)

(58) Field of Classification Search
CPC ................... H01F 27/02; H01F 27/292; H01F 2017/048; H01F 41/00; H01F 41/10; H01F 17/0013
See application file for complete search history.

(56) References Cited

U.S. PATENT DOCUMENTS 7,397,338 B2 * 7/2008 Sano ..................... H01F 27/292 336/200
11,631,527 B2 * 4/2023 Kurobe ................. H01F 27/292 336/192
11,657,955 B2 * 5/2023 Watanabe ........... H01F 27/2852 336/200
(Continued)

FOREIGN PATENT DOCUMENTS

CN 105957692 A 9/2016
CN 106158244 A 11/2016
(Continued)

OTHER PUBLICATIONS

Translation of CN-111799053-A (Year: 2020).*
(Continued)

*Primary Examiner* — Jeffrey T Carley
(74) *Attorney, Agent, or Firm* — Renaissance IP Law Group LLP

(57) ABSTRACT

The present disclosure relates to an electronic component and a method for manufacturing the same, and more particularly, to a surface mounting type electronic component provided on an electronic device and a method for manufacturing the same.

An electronic component in accordance with an exemplary embodiment includes a main body part having a polyhedral shape and including a recessed portion formed as at least a portion of a plurality of edges at which two mutually adjacent surfaces meet is recessed, an insulation part provided on a surface of the main body part to cover the recessed portion, and an electrode part separately provided
(Continued)

on the surface of the main body part except for an area on which the insulation part is provided.

8 Claims, 10 Drawing Sheets

(51) Int. Cl.
*H01F 27/29* (2006.01)
*H01F 41/04* (2006.01)

(56) References Cited

U.S. PATENT DOCUMENTS

| | | | | |
|---|---|---|---|---|
| 2011/0197408 | A1* | 8/2011 | Lee | H01G 9/0029 29/25.03 |
| 2012/0188734 | A1* | 7/2012 | Mikado | H01L 24/19 361/761 |
| 2017/0352484 | A1* | 12/2017 | Sawada | H01G 4/12 |
| 2019/0252113 | A1* | 8/2019 | Ku | H01F 41/042 |
| 2020/0118729 | A1* | 4/2020 | Lim | H01F 41/041 |
| 2021/0057138 | A1* | 2/2021 | Yang | H01F 41/041 |

FOREIGN PATENT DOCUMENTS

| | | | | | |
|---|---|---|---|---|---|
| CN | 110544573 | A | | 12/2019 | |
| CN | 111161943 | A | * | 5/2020 | H01F 27/06 |
| CN | 111799053 | A | * | 10/2020 | H01F 17/0013 |
| CN | 112002515 | A | * | 11/2020 | H01F 17/04 |
| CN | 112242223 | A | * | 1/2021 | H01F 27/292 |
| JP | 2010010426 | A | | 1/2010 | |
| JP | 2017059592 | A | | 3/2017 | |
| JP | 2018107346 | A | | 7/2018 | |
| KR | 20150032786 | A | | 3/2015 | |
| KR | 20150080800 | A | | 7/2015 | |
| KR | 20160092543 | A | | 8/2016 | |
| KR | 20170028609 | A | | 3/2017 | |
| KR | 20170085881 | A | | 7/2017 | |
| KR | 20180028374 | A | * | 3/2018 | H01F 27/025 |
| KR | 20190133529 | A | | 12/2019 | |
| KR | 20200033451 | A | | 3/2020 | |
| TW | I645427 | B | | 12/2018 | |
| TW | I645431 | B | | 12/2018 | |

OTHER PUBLICATIONS

Translation of CN-112002515-A (Year: 2020).*
Translation of CN-112242223-A (Year: 2021).*
Translation of CN-111161943-A (Year: 2020).*
Translation of KR-20180028374-A (Year: 2018).*
International Search Report for PCT/KR2021/011154 mailed Dec. 3, 2021.
Written Opinion for PCT/KR2021/011154 mailed Dec. 3, 2021.

* cited by examiner (a)

(b)

(a)

(b)

ELECTRONIC COMPONENT AND MANUFACTURING METHOD THEREFOR

TECHNICAL FIELD

The present disclosure relates to an electronic component and a method for manufacturing the same, and more particularly, to a surface mounting type electronic component provided on an electronic device and a method for manufacturing the same.

BACKGROUND ART

A plurality of electronic components are used in all sorts of electronic devices such as portable devices as well as household appliances. The electronic device has a usage frequency band that is gradually extended to a high frequency region due to developments such as multi-functionality and digital communications, and a reaction to the high frequency is also important issue in the electronic component used in the electronic device.

A power inductor that is one of the electronic components is used in a power circuit or a converter circuit through which a high current flows. The power inductor is being increasingly used instead of a typical wound-type choke coil due to the tendency toward the high frequency and miniaturization of the power circuit. Also, the power inductor is being developed for miniaturization, high current use, and low resistance as small-sized and multifunctional electronic devices are required.

The power inductor is mounted on a printed circuit board (PCB) and electrically connected with the PCB through an electrode. However, the electrode of the power inductor generally has a structure having a portion exposed to a bottom surface, which faces the PCB due to a manufacturing process, of the power inductor and even a top surface and a side surface of the power inductor. However, when the electrode of the power inductor is exposed to the top surface, short-circuit with a shield can covering the power inductor may occur, and when the electrode of the power inductor is exposed to the side surface, short-circuit with other electronic components adjacent thereto may occur.

RELATED ART DOCUMENTS (Patent document 1) KR10-2016-0092543 A

Technical Problem

The present disclosure provides an electronic component capable of preventing short-circuit with a component adjacent thereto and a method for manufacturing the same.

Technical Solution

In accordance with an exemplary embodiment, an electronic component includes: a main body part having a polyhedral shape and including a recessed portion formed as at least a portion of a plurality of edges at which two mutually adjacent surfaces meet is recessed; an insulation part provided on a surface of the main body part to cover the recessed portion; and an electrode part separately provided on the surface of the main body part except for an area on which the insulation part is provided.

A bottom surface of the main body part may form a mounting surface to which the electronic component is mounted, and the recessed portion may be defined along at least two edges at which a top surface of the main body part meets each of both side surfaces, which are opposite to each other, of the main body part.

The recessed portion may be formed as at least a portion of an edge of the top surface of the main body part is recessed by a set depth along the side surface of the main body part.

The depth of the recessed portion may be ⅕ to ½ of a length from the top surface to the bottom surface of the main body part.

The insulation part may include a first insulation part provided to cover the recessed portion and the top surface of the main body part.

The insulation part may further include: a second insulation part provided on the bottom surface of the main body part except for an area adjacent to the both side surfaces, which are opposite to each other, of the main body part; and a third insulation part provided on other side surfaces of the main body part except for the both side surfaces, which are opposite to each other, of the main body part, and the electrode part may extend from below the first insulation part to the bottom surface of the main body part on each of the both side surfaces, which are opposite to each other, of the main body part.

The electronic component may further include an insulation layer provided on each of the both side surfaces, which are opposite to each other, of the main body part to cover the electrode part.

The main body part may include: a body; and a spiral coil pattern provided in the body and connected with the electrode part.

In accordance with another exemplary embodiment, a method for manufacturing an electronic component includes: a process of allowing at least a portion of a plurality of edges of a main body part having a polyhedral shape to be recessed and forming an insulation part on a surface of the main body part to cover the recessed area of the main body part; and a process of forming an electrode part on the surface of the main body part.

The process of forming the insulation part may include: a process of preparing a laminate having a plurality of unit areas; a process of allowing one surface of the laminate to be recessed along at least a portion of a boundary line configured to partition the plurality of unit areas; a process of forming a first insulation layer on the one surface of the laminate; and a process of cutting the laminate on which the first insulation layer is formed along the boundary line.

The boundary line may include a first boundary line extending in one direction crossing the laminate and a second boundary line extending in a direction crossing the first boundary line, and the process of allowing the one surface of the laminate to be recessed may allow the one surface of the laminate to be recessed along at least one of the first boundary line and the second boundary line.

The process of allowing the one surface of the laminate to be recessed may include a process of cutting the laminate along at least a portion of the boundary line configured to partition the plurality of unit areas.

The process of preparing the laminate and the process of allowing the one surface of the laminate to be recessed may be simultaneously performed.

The process of preparing the laminate and the process of allowing the one surface of the laminate to be recessed may be performed by a process of pressing a plurality of sheets for forming the laminate on a jig in which at least one accommodation part is formed.

The plurality of sheets may include a first body sheet, a coil pattern sheet having a plurality of coil patterns, and a second body sheet, and the coil pattern sheet may be laminated so that the plurality of coil patterns overlap the accommodation part.

The process of pressing may press so that a portion of the laminate is filled in the accommodation part.

The process of forming the first insulation layer may form the first insulation layer on the entire one surface of the laminate including the recessed area.

The method may further include a process of forming a second insulation layer on the other surface, which is opposite to the one surface, of the laminate before the process of cutting the laminate along the boundary line.

The method may further include a process of forming a third insulation layer on the rest side surfaces except for the both side surfaces, which are opposite to each other, among the side surfaces configured to connect the one surface and the other surface of the cut laminate after the process of cutting the laminate along the boundary line.

The process of forming the electrode part may include a process of plating a surface of the cut laminate, and the method may further include a process of forming an insulation layer on the both side surfaces, which are opposite to each other, of the cut laminate to cover the electrode part after the process of forming the electrode part.

Advantageous Effects

In accordance with the exemplary embodiment, the short-circuit with the adjacent component may be prevented by limiting the area on which the electrode is formed in the electronic component.

That is, as the insulation layer is formed on the top surface of the electronic component and the area extending by a predetermined length along the side surface from the top surface, the formed height of the electrode may be reduced, and the short-circuit with the shield can for covering the electronic component may be effectively prevented. Also, the process of manufacturing the electronic component on which the insulation layer is formed as described above may be simplified to improve the manufacturing efficiency and the productivity.

Furthermore, as the electrode is exposed through only the bottom surface of the main body part, which is mounted to the electronic device or the circuit board, the surface mounting type electronic component having a high reliability may be realized.

DETAILED DESCRIPTION

Figure 1:
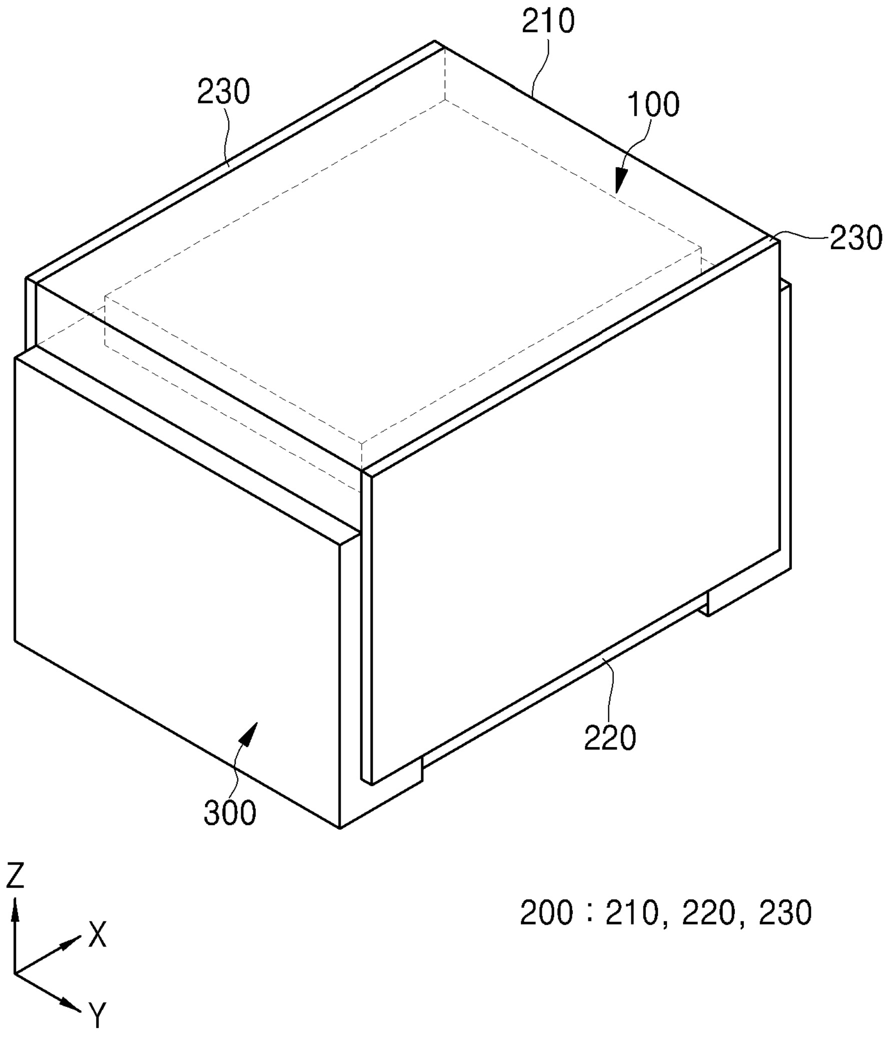
FIG. 1 is a schematic view illustrating an appearance of an electronic component in accordance with an exemplary embodiment.

Hereinafter, exemplary embodiments of the present inventive concept will be described in detail with reference to the accompanying drawings. The present invention may, however, be embodied in different forms and should not be construed as limited to the embodiments set forth herein. Rather, these embodiments are provided so that the present invention will be thorough and complete, and will fully convey the scope of the present invention to those skilled in the art. In the drawings, the thicknesses of layers and regions are exaggerated for clarity. In the figures, like reference numerals refer to like elements throughout.

Figure 2:
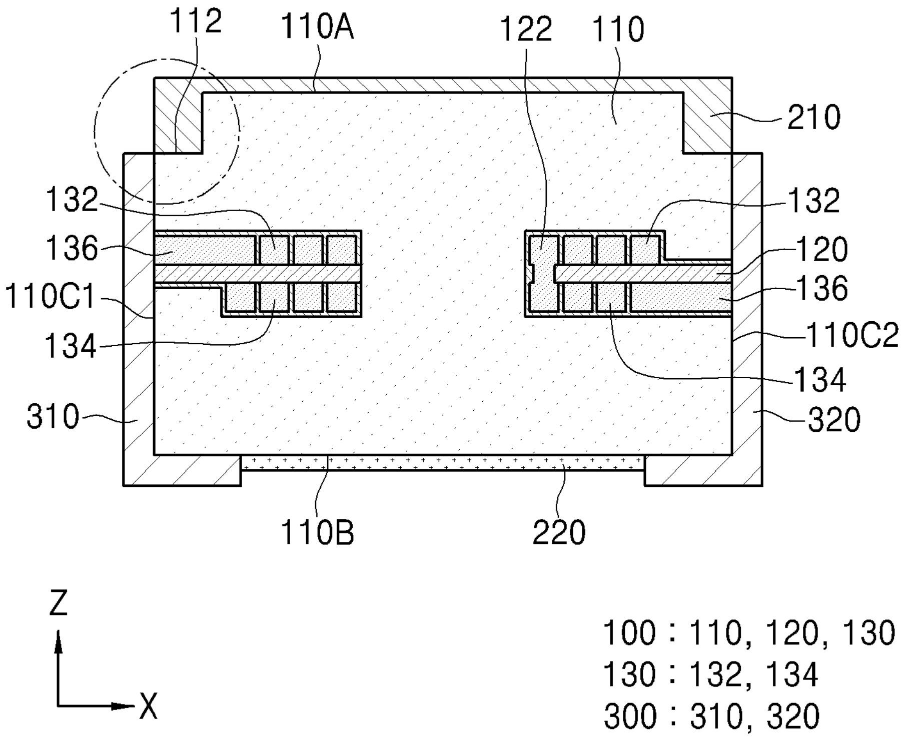
FIG. 2 is a cross-sectional view illustrating the electronic component in FIG. 1 taken along a plane extending in an X-axis direction and a Z-axis direction.
Figure 3:
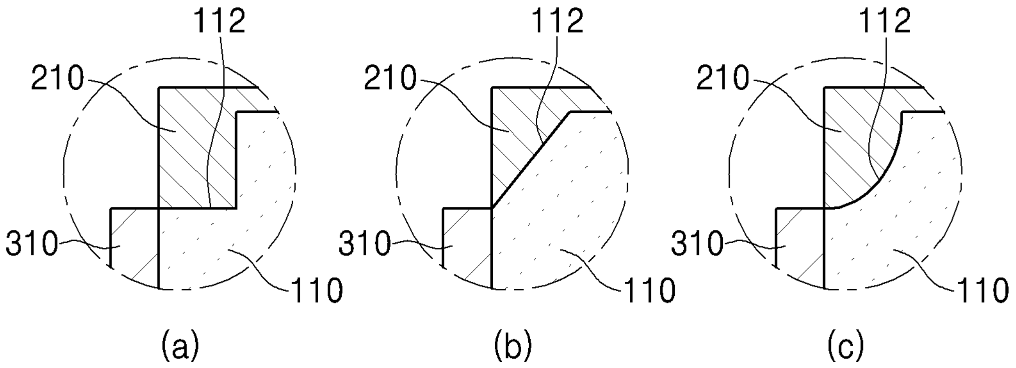
FIG. 3 is a view illustrating various shapes of a recessed portion in accordance with an exemplary embodiment.
Figure 4:
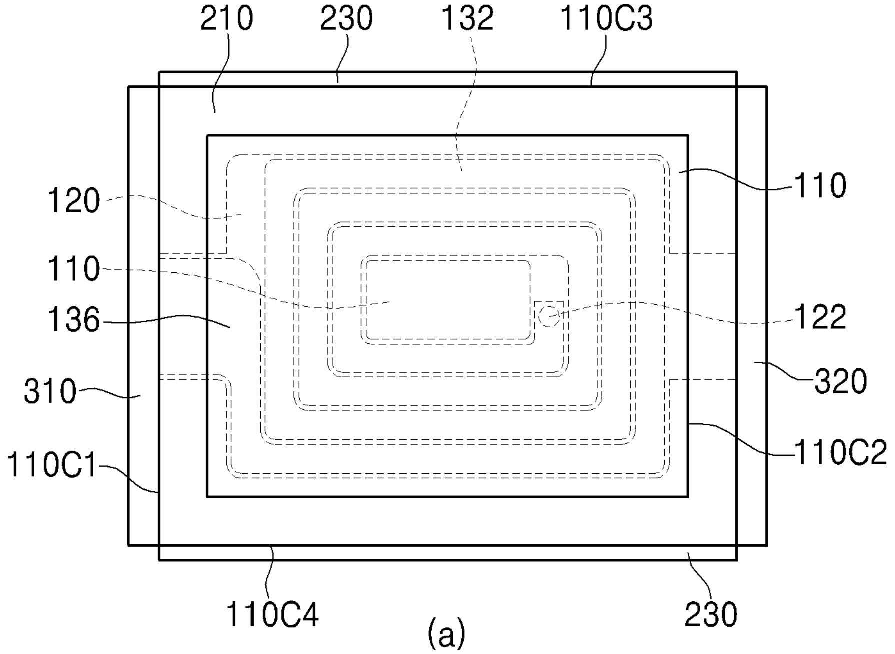
FIG. 4 is a cross-sectional view illustrating the electronic component in FIG. 1 taken along a plane extending in the X-axis direction and a Y-axis direction.
Figure 4:
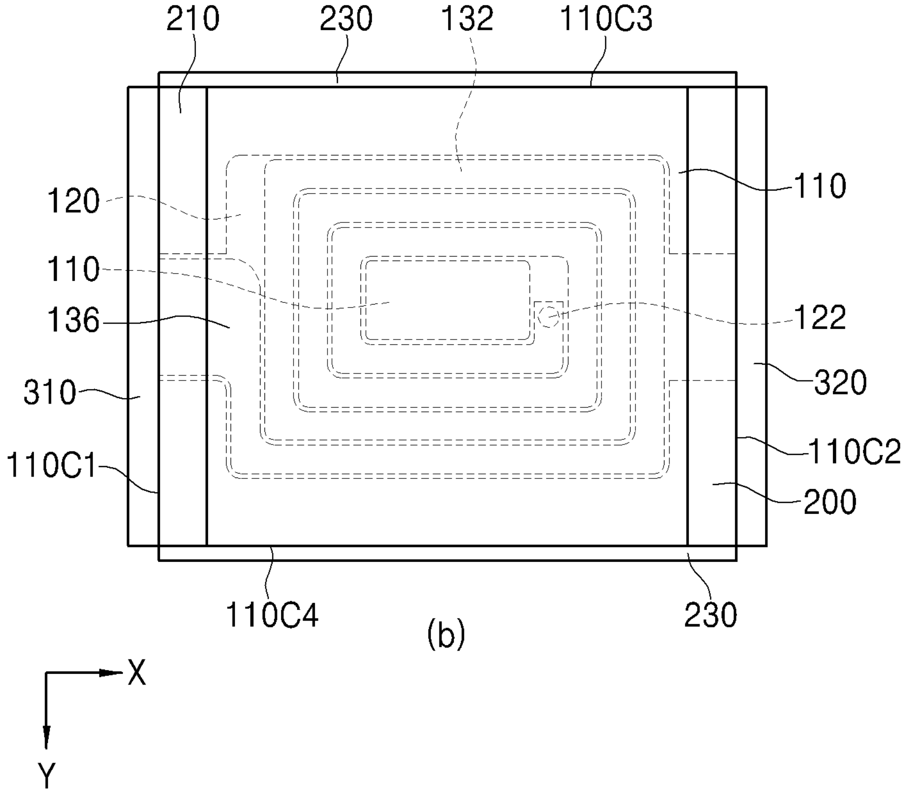

FIG. 1 is a schematic view illustrating an appearance of an electronic component in accordance with an exemplary embodiment. Also, FIG. 2 is a cross-sectional view illustrating the electronic component in FIG. 1 taken along a plane extending in an X-axis direction and a Z-axis direction, FIG. 3 is a view illustrating various shapes of a recessed portion in accordance with an exemplary embodiment, and FIG. 4 is a cross-sectional view illustrating the electronic component in FIG. 1 taken along a plane extending in the X-axis direction and a Y-axis direction.

Referring to FIGS. 1 to 4, the electronic component in accordance with an exemplary embodiment includes: a main body part 100 having a polyhedral shape and including a recessed portion 112 formed as at least a portion of a plurality of edges at which two mutually adjacent surfaces meet; an insulation part 200 provided on a surface of the main body part 100 to cover the recessed portion 112; and an electrode part 300 separately provided on the surface of the main body part 100 except for an area on which the insulation part 200 is provided.

The electronic component may include all sorts of components used in various electronic devices. Also, the electronic component may be a passive element performing various functions in the electronic device when power is applied. For example, the electronic component may include a noise filter, a diode, a varistor, a RF inductor, a power inductor, and a composite element thereof.

Here, the power inductor is an element for storing electricity in the form of a magnetic field and maintaining an output voltage to stabilize power. The power inductor may represent an inductor having a high efficiency having an inductance variance less than that of a general inductor when a directly current is applied. That is, the power inductor may include a DC bias characteristic (the inductance variation when the direct current is applied) in addition to a function of the general inductor.

Hereinafter, a detailed structure when the electronic component is the power inductor will be described as an example. However, the electronic component is not limited thereto. For example, when the electronic component is mounted to the electronic device, and power is applied, the electronic component may include all sorts of components performing various functions.

The main body part 100 may have a polyhedral shape. For example, the main body part 100 may have a hexahedral shape. That is, the main body part 100 may have an approximately hexahedral shape having a predetermined length in an X-axis direction, a predetermined width in a Y-axis direction, and a predetermined height in a Z-axis direction. In this case, the main body part 100 may have a top surface 110A, a bottom surface 110B, and four side surfaces 110C1, 110C2, 110C3, and 110C4, and the bottom surface 110B of the main body part 100 may form a mounting surface by which the electronic component is mounted. That is, the electronic component may be mounted to an electronic device or a circuit board by arranging the bottom surface of the main body part to face an electronic device or a circuit board included in the electronic device. Here, the circuit board may include a printed circuit board (PCB) on which all sorts of wires for operating the electronic device are printed.

Also, the main body part 100 may have a plurality of edges. Here, each of the edges represents a line segment at which two mutually adjacent surfaces meet. When the main body part 100 has the hexahedral shape, each of the edges is formed between the top surface 110A and the four side surfaces 110C1, 110C2, 110C3, and 110C4 of the main body part, between the bottom surface 110B and the four side surfaces 110C1, 110C2, 110C3, and 110C4 of the main body part, and between the four side surfaces 110C1, 110C2, 110C3, and 110C4.

The main body part 100 has a recessed portion 112 formed as at least a portion of the plurality of edges is recessed. For example, the recessed portion 112 may be formed as at least a portion of the plurality of edges disposed along a circumference of the top surface of the main body part 100 is recessed. The recessed portion 112 is a component for extending the insulation part 200 formed on the top surface of the main body part 100 downward along at least a portion of the side surface of the main body part 100. When the insulation part 200 extends downward from the top surface of the main body part 100 by the recessed portion 112, plating spreading to an area in which the insulation part 200 is disposed when the electrode part is formed is prevented. A detailed feature regarding this will be described later when the electrode part is described.

The recessed portion 112 may be formed on at least a portion of the plurality of edges at which the top surface of the four side surfaces 110C1, 110C2, 110C3, and 110C4 of the main body part 100 meet. For example, the recessed portion 112 may be defined along four edges at which the top surface 110A and the four side surfaces 110C1, 110C2, 110C3, and 110C4 of the main body part 100 meet or along two edges at which the top surface 110A and the both side surfaces 110C1 and 110C2, which are opposite to each other, of the main body part 100 meet. When the recessed portion 112 is defined along four edges, the insulation part 200 may extend downward along the entire side surfaces of the main body part 100. When the recessed portion 112 is defined along two edges, the insulation part 200 may extend downward from only the side surfaces on which the electrode part is formed.

The recessed portion 112 may be formed as at least a portion of the edges at which the top surface 110A of the main body part 100 is recessed with a set depth along the side surfaces 110C1, 110C2, 110C3, and 110C4 of the main body part 100. Here, the recessed portion 112 may have various shapes obtained by allowing as at least a portion of the edges of the top surface 110A of the main body part 100 to be recessed along the side surfaces 110C1, 110C2, 110C3, and 110C4 of the main body part 100. For example, as illustrated in (a) of FIG. 3, the recessed portion 112 may have a shape recessed so that the edge of the top surface 110A of the main body part 100 is stepped. However, the shape of the recessed portion 112 is not limited thereto. For example, the recessed portion 112 may have various shapes such as a shape in which the top surface 110A of the main body part 100 is chamfered as illustrated in (b) of FIG. 3 or a shape in which the top surface 110A of the main body part 100 is recessed into a curved surface as illustrated in (c) of FIG. 3.

Here, the recessed portion 112 may have a depth that is ⅕ to ½ of a height of the main body part 100, i.e., a length from the bottom surface 110B to the top surface 110A of the main body part 100. That is, the recessed portion 112 may be formed with a depth that is ⅕ to ½ of a length from the top surface 110A to each of the side surfaces 110C1, 110C2, 110C3, and 110C4 of the main body part 100 in the Y-axis direction. Here, when the recessed portion 112 is formed with a depth less than ⅕ of the length of each of the side surfaces 110C1, 110C2, 110C3, and 110C4 in the Y-axis direction, the insulation part 200 covering the top surface 110A of the main body part 100 may not extend downward with a sufficient length sufficient, and when the recessed portion 112 is formed with a depth greater than ½ of the length of each of the side surfaces 110C1, 110C2, 110C3, and 110C4 in the Y-axis direction, a lead-out part may not be electrically connected to the electrode part because the lead-out part that is generally exposed from a central portion of the both side surfaces 110C1 and 110C2, which are opposite to each other, of the main body part 100 is covered.

Also, the main body part 100 may include a body 110 and a spiral coil pattern 130 provided in the body 110 and connected with the electrode part 300 that will be described later.

The body 110 may form an outer shape of the main body part 100. Thus, the body 110 may have a polyhedral shape having a plurality of edges like the main body part 100, and the above-described recessed portion 112 may be formed on at least a portion of a plurality of edges of the body 110. The above-described body 110 may be formed by mixing metal power with an insulating material.

The metal powder may use one kind of particles or at least two kinds of particles, which have the same size as each other, or may use one kind of particles or at least two kinds of particles, which have a plurality of sizes. Here, the metal powder may be made of the same material or different materials. When the metal powder has different average particle sizes, the metal powder may be uniformly mixed and distributed in the entire body 110 to maintain a uniform magnetic permeability. Also, when the at least two kinds of metal powder having sizes different from each other are used, the body 110 may increase in filling rate and thus be maximized in capacity.

The metal powder may use a metal material in which Si, B, Nb, and Cu are added based on iron (Fe). For example, the metal powder may include at least one metal selected from the group consisting of iron-silicon (Fe—Si), iron-nickel-silicon (Fe—Ni—Si), iron-silicon-boron (Fe—Si—B), iron-silicon-chrome (Fe—Si—Cr), iron-silicon-aluminum (Fe—Si—Al), iron-silicon-chrome-boron (Fe—Si—Cr—B), iron-aluminum-chrome (Fe—Al—Cr), iron-silicon-boron-niobium-copper (Fe—Si—B—Nb—Cu), and iron-silicon-chrome-boron-niobium-copper (Fe—Si—Cr—B—Nb—Cu). That is, the metal powder may be formed of a metal alloy including iron to have a magnetic structure or magnetic property, thereby having a predetermined magnetic permeability.

The insulating material may be mixed with the metal powder to insulate the metal powder particles from each other. That is, the metal powder may increase in loss of eddy current and hysteria at a high frequency to cause a loss of the material. To reduce the loss of the material, the insulating material may be contained in the body 110 to insulate the metal powder particles from each other. The insulating material may include at least one selected from the group consisting of epoxy, polyimide, and liquid crystalline polymer (LCP). However, the exemplary embodiment is not limited thereto. Alternatively, the insulating material may be made of a thermosetting resin such as an epoxy resin to provide the insulating property between the metal powder particles.

The coil pattern 130 has a spiral shape and is provided in the body 110. The coil pattern 130 may be formed on at least one surface, preferably, both surfaces of a support layer 120. The coil pattern 130 may be formed on a predetermined area of the support layer 120, e.g., formed outward from a central portion thereof in a spiral shape, and the two coil patterns 130 formed on both surfaces of the support layer 120 may be connected to form one coil. That is, each of the coil patterns 130 may have a spiral shape from the outside of a through-hole defined in the central portion of the support layer 120. Also, the coil patterns 130 may be connected to each other through a conductive via 122 defined in the support layer 120. Here, an upper coil pattern 132 and a lower coil pattern 134 may have the same shape and the same height as each other.

Here, the support layer 120 may have a shape in which metal foil is attached to each of top and bottom surfaces of a base having a predetermined thickness. Here, the base may include glass reinforced fibers, plastic, and ferrite. For example, the support layer 120 may include copper clad lamination (CCL) in which copper foil is bonded to a glass reinforced fiber.

When the coil pattern 130 is formed on at least one surface of the support layer 120 as described above, an inner insulation layer may be provided to cover the top and bottom surfaces of the coil pattern 130 to insulate the coil pattern 130 and the metal powder in the body. The inner insulation layer may be formed to cover the support layer 120 in addition to the top and bottom surfaces of the coil pattern 130, and the support layer 120 and the coil pattern 130 may be formed on an entire exposed area of the body 110.

The insulation part 200 may be provided on a surface of the main body part to cover the recessed portion 112. Here, the insulation part 200 may include a first insulation part 210 provided to cover all of the recessed portion 112 and the top surface 110A of the main body part 100.

As described above, the recessed portion 112 may be formed on at least a portion of the plurality of edges at which the top surface of the four side surfaces 110C1, 110C2, 110C3, and 110C4 of the main body part 100 meet. In this case, the first insulation part 210 may be provided to cover the top surface 110A of the main body part 100 and the recessed portion 112 formed on the entire edges along a circumference of the top surface 110A of the main body part 100 as illustrated in (a) of FIG. 4.

Also, the recessed portion 112 may be formed on two edges at which the top surface 110A of the main body part 100 contacts each of the both side surfaces, which are opposite to each other, of the main body part 100. In this case, the first insulation part 210 may be provided to cover the recessed portion 112 formed on the two edges at which the top surface 110A of the main body part 100 contacts each of the both side surfaces, which are opposite to each other, of the main body part 100 as illustrated in (b) of FIG. 4. Although the first insulation part 210 covering the top surface 110A and the recessed portion 112 of the main body part 100 have the same height in the drawing, the first insulation part 210 may have various shapes for covering all of the top surface 110A and the recessed portion 112 of the main body part 100.

Here, the first insulation part 210 may be made of a material having an excellent insulating property, an excellent coating property, and an excellent adhesion property. For example, the first insulation part 210 may be made of a material containing an epoxy resin. However, the exemplary embodiment is not limited to the material of the first insulation part 210. For example, the first insulation part 210 may be made of various materials having an insulating property.

The insulation part 200 may further include a second insulation part 220 provided on the bottom surface 110B of the main body part except for an area adjacent to the both side surfaces 110C1 and 110C2, which are opposite to each other, of the main body part 100. Also, the insulation part 200 may further include a third insulation part 230 provided on other side surfaces 110C3 and 110C4 of the main body part 100 except for the both side surfaces 110C1 and 110C2, which are opposite to each other, of the main body part 100.

As described above, when the electronic component further includes the second insulation part 220 and the third insulation part 230, only an area except for an area in which the first insulation part 210 extends in the both side surfaces 110C1 and 110C2, which are opposite to each other, of the main body part 100 and an area adjacent to the both side surfaces 110C1 and 110C2 in the bottom surface 110B may be exposed.

The electrode part 300 may be provide separately from the surface of the main body part 100 except for an area in which the insulation part 200 is provided to apply power to the main body part 100. Here, the electrode part 300 may include a first electrode 310 and a second electrode 320, which are respectively provided on the both side surfaces 110C1 and 110C2, which are opposite to each other, of the main body part 100. The first electrode 310 may have a 'L'-shape extending from one side surface 110C1 of the main body part 100 to the bottom surface 110B of the main body part 100, and the second electrode 320 may have a 'L'-shape extending from the other side surface 110C2 of the main body part 100 to the bottom surface 110B of the main body part 100.

The electrode part 300 may be made of metal having an electrical conductivity. For example, the electrode part 300 may be made of at least one metal selected from the group consisting of gold, silver, platinum, copper, nickel, palladium, and an alloy thereof. Also, the electrode part 300 may include a first electrode layer formed on the surface of the main body part 100 and a second electrode layer formed on the first electrode layer. Here, the first electrode layer may be made of a material containing copper, and the second electrode layer may be made of a material containing nickel or tin.

Here, the electrode part 300 may be formed through a plating process. Plating is performed while a metal layer is formed along a metal material. As described above, the body 110 includes the metal powder. Thus, the electrode part 300 may extend along the surface of the body 110 by the plating process. However, the electrode part 300 is hardly formed on the area in which the insulation part 200 is formed. Thus, when the electrode part 300 is formed through the plating process, the electrode part does not spread from the both side surfaces 110C1 and 110C2, which are opposite to each other in the X-axis direction of the main body part 100, to an area in which the first insulation part 210 is formed. That is, the electrode part 300 is formed as much as a height spaced downward from the top surface 110A of the main body part 100 on the both side surfaces 110C1 and 110C2, which are opposite to each other, of the main body part 100. Thus, short-circuit with other components, e.g., a shield can for covering the electronic component, may be effectively prevented. Although the electrode part 300 is not formed at all on the first insulation part 210 in the drawing, the electrode part 300 may partially extend onto the first insulation part 210.

Also, when the second insulation part 220 is provided on a partial area of the bottom surface 110B of the main body part, and the third insulation part 230 is provided on other side surfaces 110C3 and 110C4 of the main body part 100, the first electrode 310 may have a 'L'-shape extending from one side surface 110C1 of the main body part 100 to the bottom surface 110B of the main body part 100, and the second electrode 320 may have a 'L'-shape extending from the other side surface 110C2 of the main body part 100 to the bottom surface 110B of the main body part 100 Thus, when the electronic component is mounted through the surface thereof, the electronic component may be firmly soldered and connected to a circuit board through the bottom surface and the both side surfaces thereof.

Figure 5:
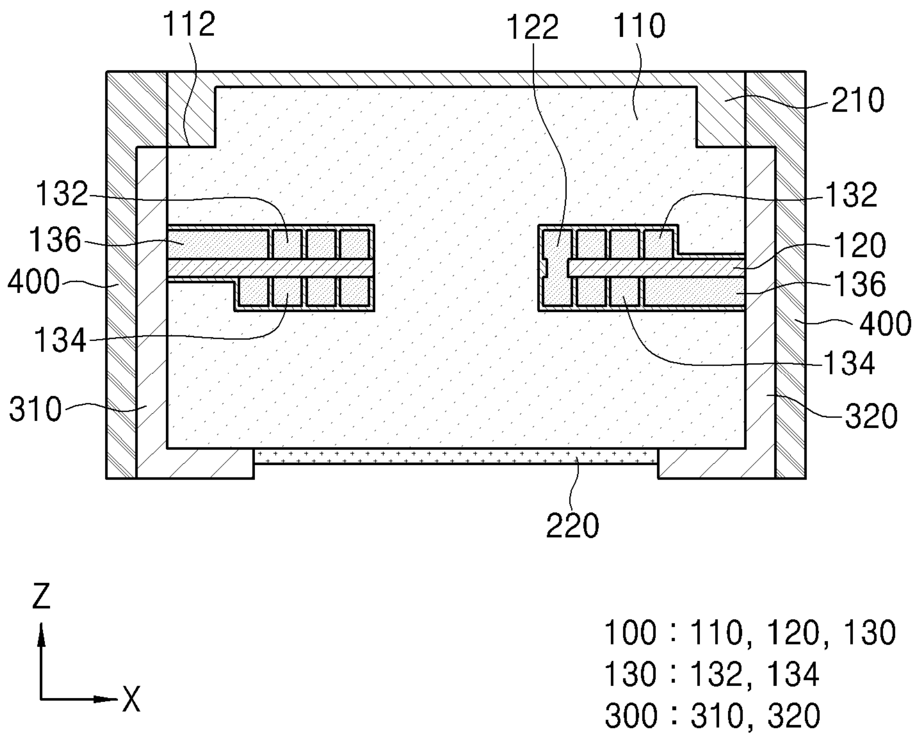
FIG. 5 is a schematic view illustrating an appearance of an electronic component in accordance with another exemplary embodiment.

FIG. 5 is a schematic view illustrating an appearance of an electronic component in accordance with another exemplary embodiment.

As described above, when the electrode part 300 is formed with the 'L'-shape, the electronic component may be firmly connected to the circuit board through the bottom surface and the both side surfaces thereof. Here, when a plurality of electronic components are integrated on a circuit board and arranged adjacent to each other, short-circuit may occur between the electronic components. Thus, the electronic component in accordance with another exemplary embodiment may further include an insulation layer 400 disposed on the both side surfaces 110C1 and 110C2, which are opposite to each other, of the main body part 100 to cover each of the first electrode 310 and the second electrode 320. In this case, short-circuit with other components adjacent to the electronic component in a side direction of the main body part 100 may be prevented, and the first electrode 310 and the second electrode 320 are exposed through only the bottom surface 110B of the main body part 100, which faces the electronic device or the circuit board, the surface mounting type electronic component having a high reliability may be realized. Although the insulation layer 400 has the same height as the first insulation part 210 in the drawing, the insulation layer 400 may partially extend onto the first insulation part 210.

Hereinafter, a method for manufacturing the electronic component in accordance with an exemplary embodiment will be described. The method for manufacturing the electronic component in accordance with an exemplary embodiment is a method for manufacturing the above-described electronic component, and a feature overlapped with the above-described feature in relation to the electronic component will be omitted.

Figure 6:
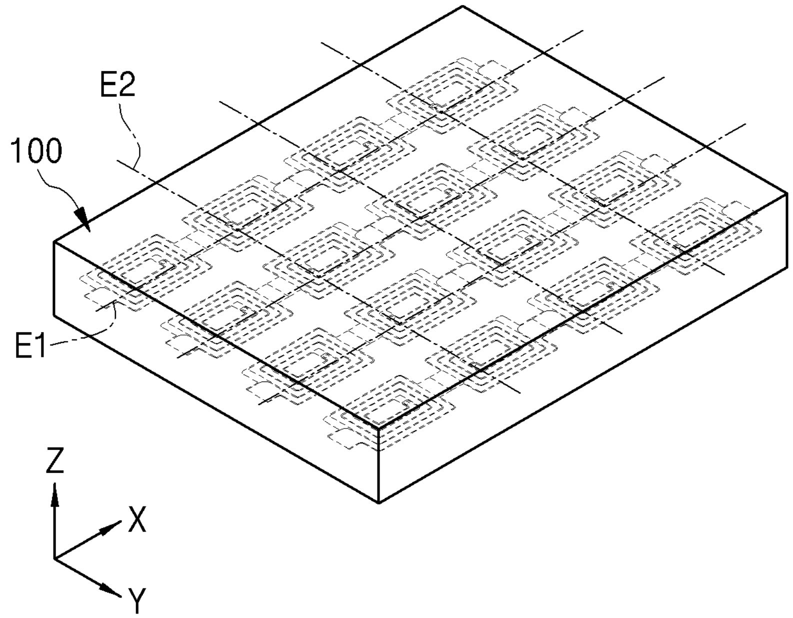
FIG. 6 is a view illustrating a state in which a laminate is prepared in accordance with an exemplary embodiment.
Figure 7:
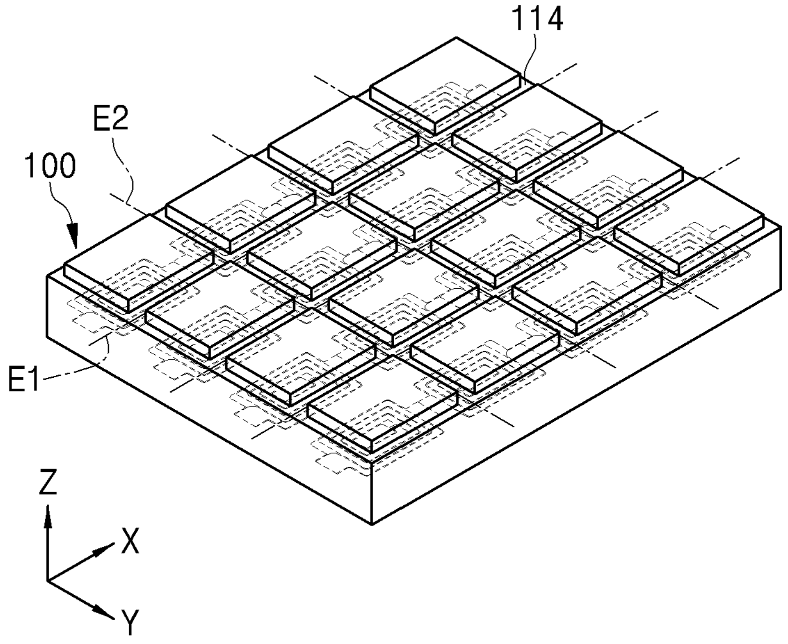
FIG. 7 is a view illustrating a state in which one surface of the laminate is recessed in accordance with an exemplary embodiment.

FIG. 6 is a view illustrating a state in which a laminate is prepared in accordance with an exemplary embodiment, and FIG. 7 is a view illustrating a state in which one surface of the laminate is recessed in accordance with an exemplary embodiment.

The method for manufacturing the electronic component in accordance with an exemplary embodiment include: a process of allowing at least a portion of a plurality of edges of the main body part 100 having the polyhedral shape to be recessed and forming the insulation part 200 on the surface of the main body part 100 to cover the recessed area of the main body part 100; and a process of forming the electrode part 300 on the surface of the main body part 100.

For example, the process of forming the insulation part 200 may form the recessed portion by allowing at least a portion of the edge of the main body part 100 having the polyhedral shape to be recessed and form the insulation part 200 on the surface of the main body part 100 to cover the recessed portion 112. Here, the insulation part 200 may include a first insulation part 210 provided to cover all of the top surface 110A and the recessed portion 112 of the main body part 100, and may further include a second insulation part 220 provided on the bottom surface 110B of the main body part 100 except for an area adjacent to the both side surfaces 110C1 and 110C2, which are opposite to each other, of the main body part 100 and a third insulation part 230 provided on other side surfaces 110C3 and 110C4 except for the both side surfaces 110C1 and 110C2, which are opposite to each other, of the main body part 100 in addition to the first insulation part 210.

As described above, although the process of forming the insulation part 200 may be performed by allowing a portion of the edge of each main body part 100 to be recessed and forming the insulation part 200 to cover the recessed area, the process of forming the insulation part 200 may be simultaneously performed by using a laminate including a plurality of unit areas for forming the main body part 100 before the laminate is cut into each unit area as illustrated in FIGS. 6 and 7.

To this end, the process of forming the insulation part 200 may include: a process of preparing a laminate including a plurality of unit areas; a process of allowing one surface of the laminate to be recessed along at least a portion of boundary lines E1 and E2 for partitioning the plurality of unit areas; a process of forming the first insulation layer 212 on one surface of the laminate; and a process of cutting the laminate on which the first insulation layer 212 is formed along the boundary lines E1 and E2.

As illustrated in FIG. 6, the laminate represents a structure in which the plurality of unit areas for forming a plurality of electronic components, e.g., a plurality of main body parts 100, are arranged on the X-Y plane. The unit area represents a partial area of the laminate, on which one main body part 100 is formed when the laminate is cut. The plurality of unit areas may be arranged in plurality in the X-axis direction and the Y-axis direction with the a plurality of first boundary lines E1 crossing the laminate and extending in the X-axis direction and a plurality of second boundary lines E2 crossing the laminate and extending in the Y-axis direction to partitioning each unit area therebetween.

The process of preparing the laminate may be performed by preparing a plurality of sheets for forming the laminate and pressing the plurality of sheets. That is, the process of preparing the laminate may be performed by arranging and laminating a coil pattern sheet having a plurality of coil patterns between at lest two body sheets for forming the body 110 of the main body part 100 and then pressing the laminate. Here, a boundary between the adjacent body sheets may be integrated and thus hardly checked without using a scanning electron microscope (SEM).

The process of allowing one surface of the laminate to be recessed allows one surface of the laminate to be recessed along at least a portion of the boundary lines E1 and E2 for partitioning the plurality of unit areas. That is, as illustrated in FIG. 7, the process of allowing one surface of the laminate to be recessed may form a groove 114 along at least a portion of the first boundary line E1 and the second boundary line E2 by allowing one surface of the laminate to be recessed along at least a portion of the first boundary line E1 and the second boundary line E2.

As described above, although the process of allowing one surface of the laminate to be recessed may form the groove 114 by cutting the one surface of the laminate with a predetermined depth along at least a portion of the first boundary line E1 and the second boundary line E2 by after the laminate is prepared, the process of preparing the laminate and the process of allowing one surface of the laminate to be recessed may be simultaneously performed in order to simplify a manufacturing process. This is performed by using a jig 10 in which at least one accommodation part 12 is formed in the rest area except for an area facing at least one of the first boundary line E1 and the second boundary line E2, which will be described in detail below.

Figure 8:
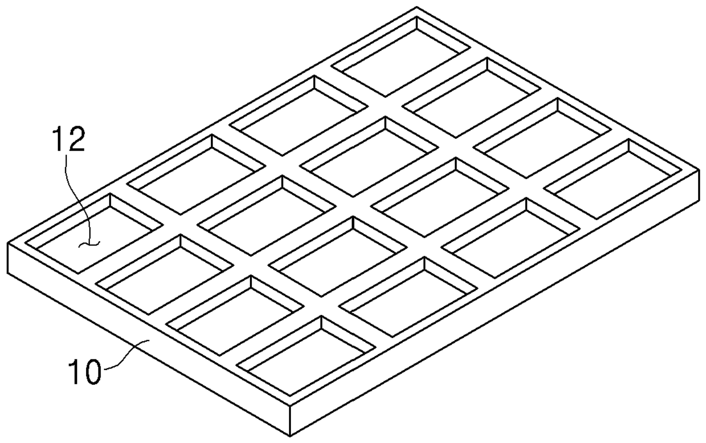
FIG. 8 is a schematic view illustrating an appearance of a jig used in a method for manufacturing an electronic component in accordance with an exemplary embodiment.
Figure 8:
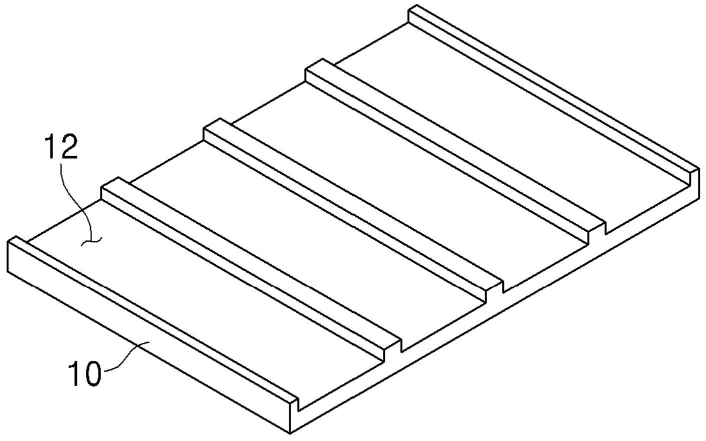
Figure 8:
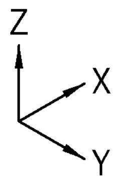

FIG. 8 is a schematic view illustrating an appearance of the jig used in the method for manufacturing the electronic component in accordance with an exemplary embodiment, and FIGS. 9 to 16 are views sequentially illustrating the method for manufacturing the electronic component in accordance with an exemplary embodiment.

As illustrated in FIG. 8, the jig 10 includes at least one accommodation part 12 formed in the rest area except for the area facing at least one of the first boundary line E1 and the second boundary line E2. For example, as illustrated in (a) of FIG. 8, the jig 10 may include a plurality of accommodation parts 12 formed in the rest area except for an area facing each of the first boundary line E1 extending in the X-axis direction and the second boundary line E2 extending in the Y-axis direction. Also, as illustrated in (b) of FIG. 8, the jig may include a plurality of accommodation parts 12 formed in the rest area except for an area facing the second boundary line E2 extending in the Y-axis direction. Here, when the jig 10 illustrated in (a) of FIG. 8 is used, the electronic component in which the recessed portion 112 is provided along four edges at which the top surface 110A of the main body part 100 meets each of the four side surfaces 110C1, 110C2, 110C3, and 110C4 of the main body part 100 as illustrated in (a) of FIG. 4 may be manufactured. Also, when the jig 10 illustrated in (b) of FIG. 8 is used, the electronic component in which the recessed portion 112 is provided along two edges at which the top surface 110A of the main body part 100 meets each of the both side surfaces 110C1 and 110C2, which are opposite to each other, of the main body part 100 as illustrated in (b) of FIG. 4 may be manufactured.

The process of preparing the laminate and the process of allowing one surface of the laminate to be recessed may be simultaneously performed by a process of sequentially laminating and pressing a first body sheet 114, a coil pattern sheet 140 having a plurality of coil patterns 130, and a second body sheet 116 on the jig 10 in which at least one accommodation part 12 is formed in the rest area except for the area facing at least one of the first boundary line E1 and the second boundary line E2.

Figure 9:
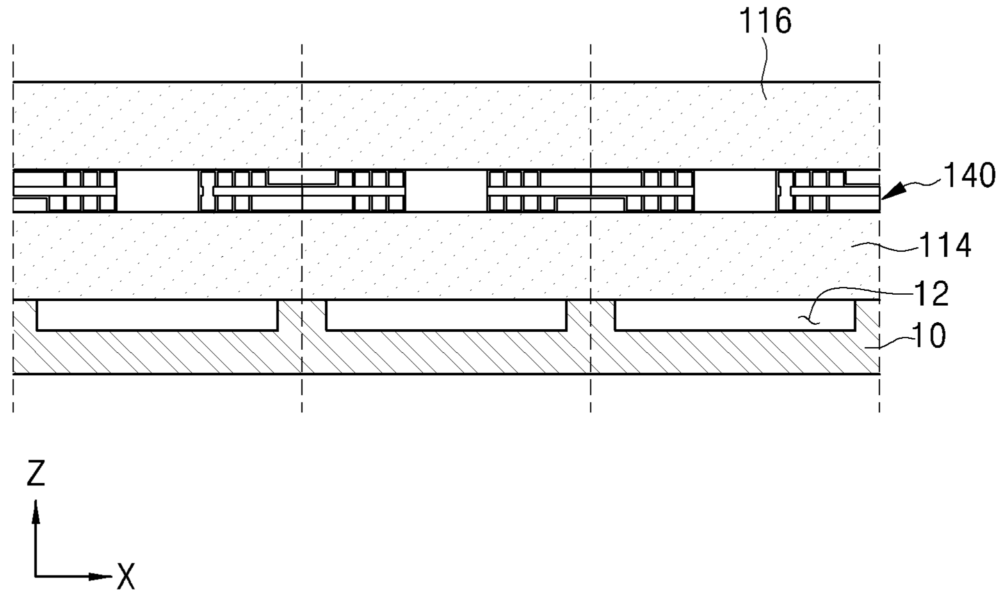
FIGS. 9 to 16 are views sequentially illustrating the method for manufacturing the electronic component in accordance with an exemplary embodiment.

More specifically, in the process of preparing the laminate, the first body sheet 114 is positioned on the jig 10, the coil pattern sheet 140 having the plurality of coil patterns 130 is positioned on the first body sheet 114, and the second body sheet 116 is positioned on the coil pattern sheet 140 as illustrated in FIG. 9. Here, each of the first body sheet 114 and the second body sheet 116, as a component that is pressed to form a body layer 118 in a following process, may be a magnetic sheet containing metal powder and an insulating material and having a predetermined thickness. Also, the coil pattern sheet 140, as a component having the plurality of coil patterns 130 respectively arranged on the plurality of unit areas, has a structure in which the plurality of coil patterns 130 are arranged in plurality in the X-axis direction and the Y-axis direction by the support layer 120 and the lead-out part 136.

Here, the coil pattern sheet 140 may be positioned so that the plurality of coil patterns 130 overlap the accommodation part 12 formed in the jig 10. That is, when the jig 10 illustrated in (a) of FIG. 8 is prepared, the coil pattern sheet 140 may be positioned so that the plurality of coil patterns 130 respectively overlap the plurality of accommodation parts 12 formed in the jig 10, and when the jig 10 illustrated in (b) of FIG. 8 is prepared, the coil pattern sheet 140 may be positioned so that the plurality of coil patterns 130 arranged in the Y-axis direction overlap one accommodation part 12 formed in the jig 10. As described above, when the coil pattern sheet 140 is positioned so that the plurality of coil patterns 130 overlap the accommodation part 12 formed in the jig 10, an arranged position of the coil pattern may be exactly adjusted, and the position of the coil pattern may be prevented from being twisted when the first body sheet 114, the coil pattern sheet 140, and the second body sheet 116 are pressed on the jig 10.

Figure 10:
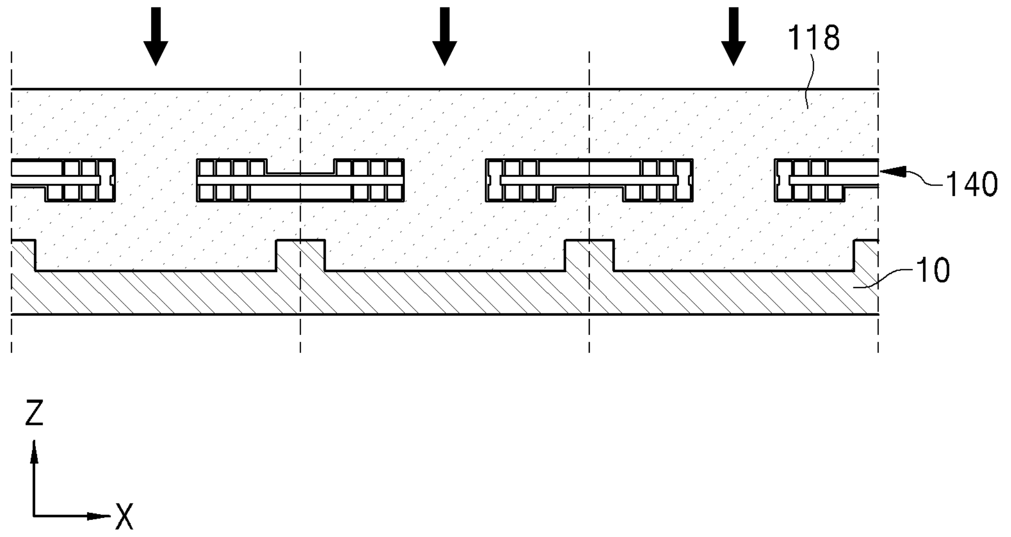
Figure 11:
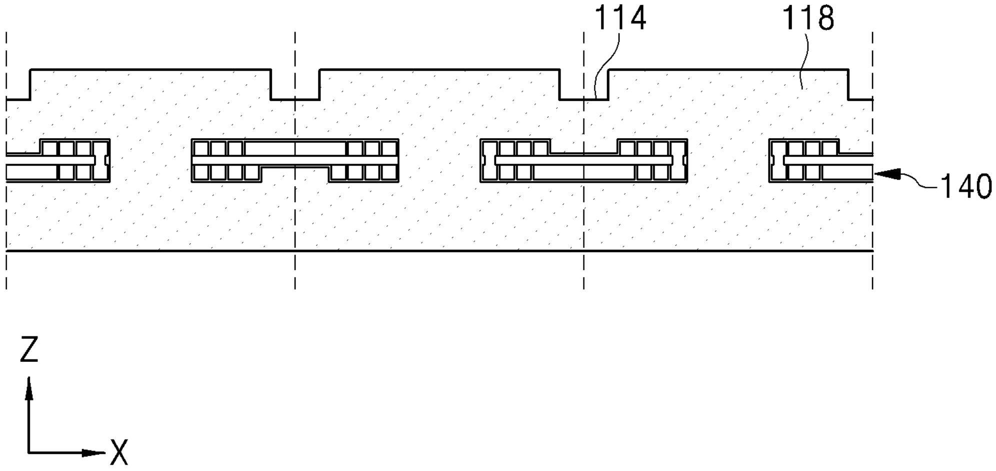

As illustrated in FIG. 10, the process of sequentially laminating and pressing the first body sheet 114, the coil pattern sheet 140 having the plurality of coil patterns 130, and the second body sheet 116 on the jig 10 is pressed so that a portion of the laminate is filled into the accommodation part 12 formed in the jig 10. This pressing may be performed by warm isostatic press (WIP). The WIP is a method of pressing by using water or oil as a pressing medium. Since a uniform pressure is applied when the WIP is used, the first body sheet 114, the coil pattern sheet 140, and the second body sheet 116 may be uniformly pressed.

By the above-described pressing, the groove 114 may be formed along at least a portion of the first boundary line E1 and the second boundary line E2. That is, an area along at least a portion of the first boundary line E1 and the second boundary line E2 contacts a portion, in which the accommodation part 12 is not formed, of the jig 10 and is pressed with a relatively great pressure, and the other area contacts the accommodation part 12 of the jig 10 and is pressed with a relatively small pressure so as to be filled in the accommodation part 12. Thus, the first body sheet 114 and the second body sheet 116 may be integrated to form the body layer 118 in which the coli pattern sheet 140 is disposed therebetween, and at the same time, the groove 114 may be formed along at least a portion of the first boundary line E1 and the second boundary line E2.

The process of forming the first insulation layer 212 forms the first insulation layer 212 on one surface of the laminate. Here, when the laminate is cut along the boundary line, the first insulation layer 212 forms the first insulation part 210 on the main body part 100. The jig 10 may be removed from the laminate before the first insulation layer 212 is formed, and the laminate may be reversely arranged as in FIG. 11 so that the one surface in which the groove 114 is formed faces upward to easily form the first insulation layer 212.

Figure 12:
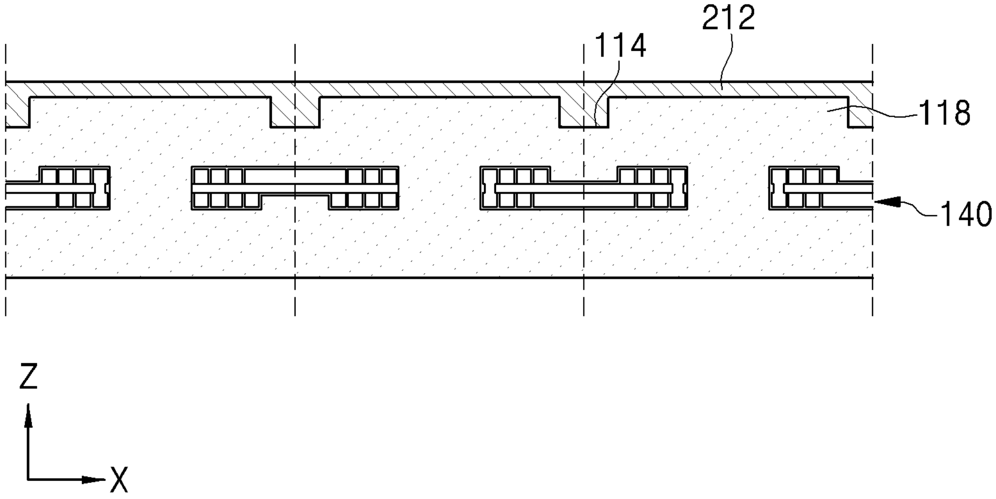

The process of forming the first insulation layer 212 forms the first insulation layer 212 on one surface of the laminate. Here, as illustrated in FIG. 12, the process of forming the first insulation layer 212 forms the first insulation layer 212 on the entire one surface of the laminate, which includes the recessed area formed along at least one of the first boundary line E1 and the second boundary line E2, i.e., the groove 114.

Although not shown in the drawing, after the process of forming the first insulation layer 212, a process of forming the second insulation layer on the other surface, which is opposite to the one surface, of the laminate may be performed. Here, the process of forming the second insulation layer may be performed by forming the insulation layer on entire the other surface of the laminate and patterning to remove an area along the second boundary line E2 from the insulation layer formed on entire the other surface. The second insulation layer is separated by a cutting process that will be described later to form the second insulation part 220.

Figure 13:
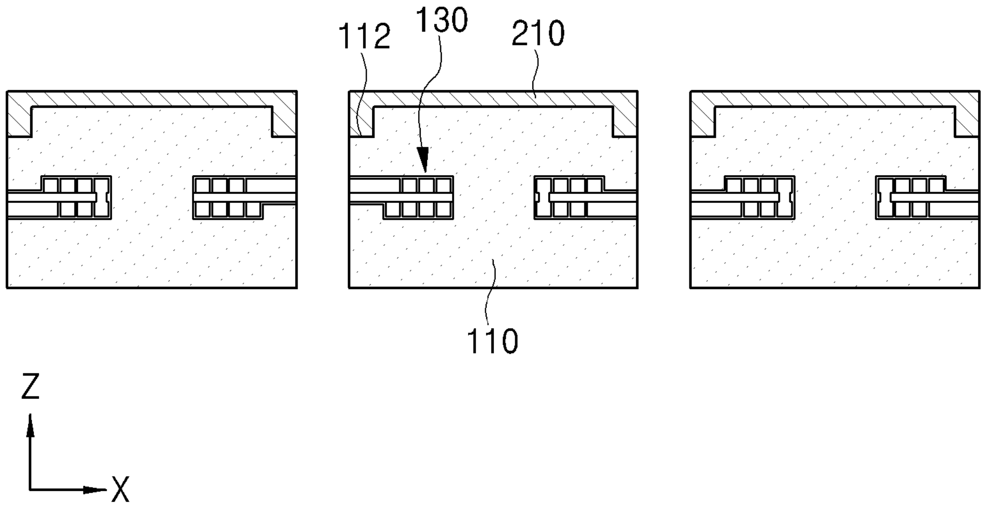
Figure 14:
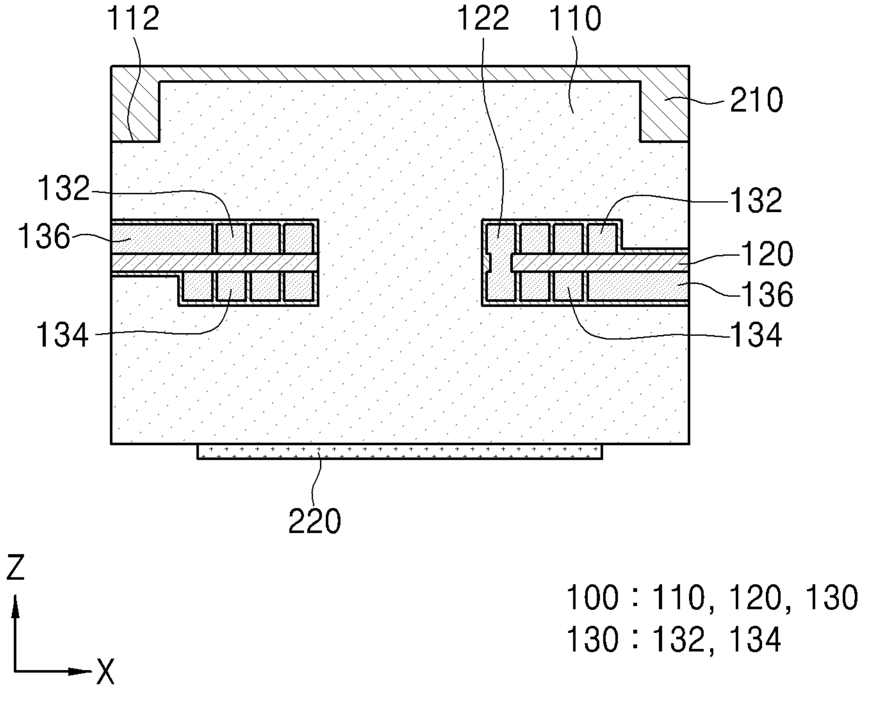

When the first insulation layer 212 is formed on the one surface of the laminate through the above-described process, a process of cutting the laminate on which the first insulation layer 212 is formed along the boundary line is performed as in FIG. 13. When the laminate is cut along the first boundary line extending in the X-axis direction and the second boundary line extending in the Y-axis direction, a plurality of intermediate components each including the main body part 100 having the recessed portion 112 formed as at least a portion of the plurality of edges is recessed and the first insulation part 210 provided on the surface of the main body part 100 to cover the recessed portion 112.

Thereafter, although not shown, a process of forming the third insulation layer on the rest side surfaces 110C3 and 110C4 except for the both side surfaces 110C1 and 110C2, which are opposite to each other, among the side surfaces connecting the one surface and the other surface may be performed. Here, the third insulation layer may correspond to the third insulation part 230, and as the third insulation layer is formed, only an area except for an area in which the first insulation part 210 extends in the both side surfaces 110C1 and 110C2, which are opposite to each other, of the main body part 100 and an area adjacent to the both side surfaces 110C1 and 110C2 in the bottom surface 110B may be exposed.

Figure 15:
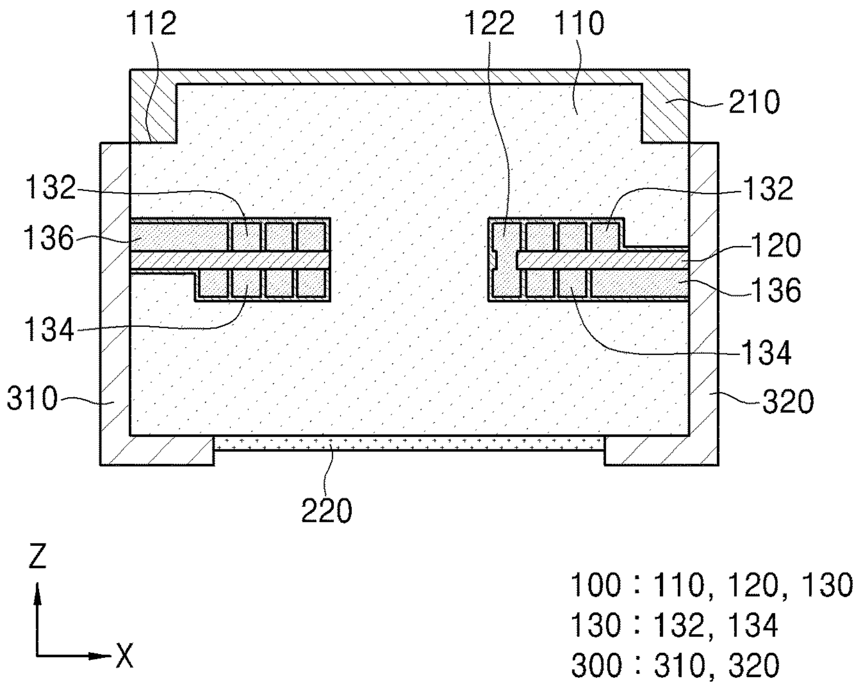

The process of forming the electrode part 300 forms the electrode part 300 on the surface of the main body part 100 except for an area in which the insulation layer is provided as illustrated in FIG. 15. As described above, only the area except for an area in which the first insulation part 210 extends in the both side surfaces 110C1 and 110C2, which are opposite to each other, of the main body part 100 and the area adjacent to the both side surfaces 110C1 and 110C2 in the bottom surface 110B may be exposed by the first insulation layer 212, the second insulation layer, and the third insulation layer. Thus, when the electrode part 300 is formed by a plating process, the electrode part 300 is separately provided to have a 'L'-shape extending to the bottom surface 110B of the main body part 100 from the both side surfaces 110C1 and 110C2, which are opposite to each other, in the X-axis direction along the exposed surface of the main body part 100.

Figure 16:
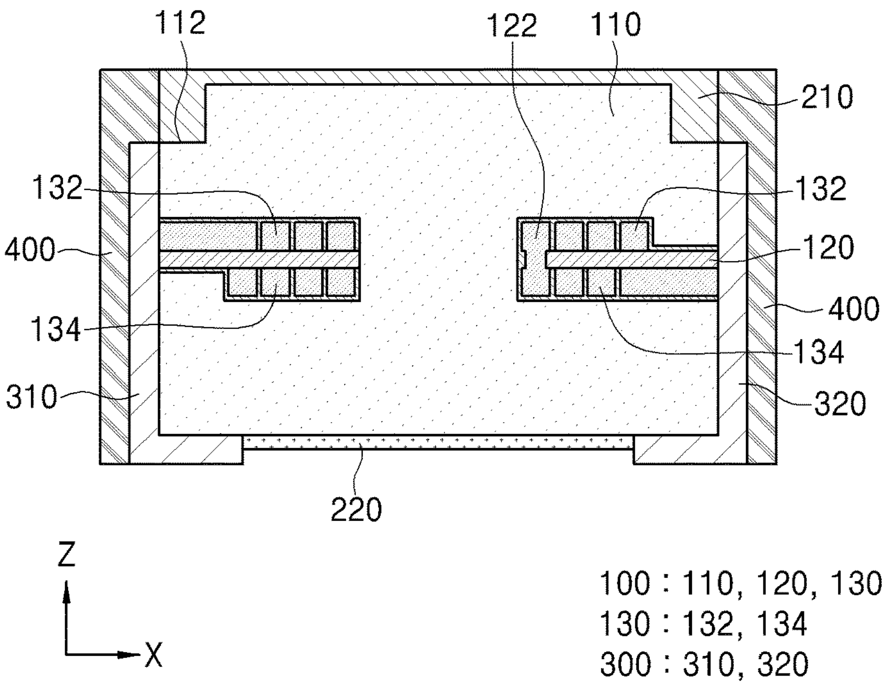

After the process of forming the electrode part 300, a process of forming an insulation layer 400 on the both side surfaces 110C1 and 110C2, which are opposite to each other, to cover the electrode part 300 may be further performed as illustrated in FIG. 16. That is, when the electrode part 300 is formed with the shape, as a plurality of electronic components are integrated and arranged adjacent to each other, short-circuit may occur between the electronic components. Thus, fourth insulation layer 400 may be provided on the both side surfaces 110C1 and 110C2, which are opposite to each other, of the main body part 100 to respectively cover the first electrode 310 and the second electrode 320.

As described above, in accordance with an exemplary embodiment, the short-circuit with adjacent components may be prevented by limiting an area on which the electrode is formed in the electronic component.

That is, as the insulation layer is formed until an area extending with a predetermined length along the side surface from the top surface in addition to the top surface of the electronic component, the formed height of the electrode may be reduced, and the short-circuit with the shield can covering the electronic component may be effectively prevented. Also, the process of manufacturing the electronic component on which the insulation layer is formed as described above may be simplified to improve the manufacturing efficiency and the productivity.

Furthermore, as the electrode is exposed through only the bottom surface of the main body part, which is mounted to the electronic device or the circuit board, the surface mounting type electronic component having a high reliability may be realized.

Although the specific embodiments are described and illustrated by using specific terms, the terms are merely examples for clearly explaining the embodiments, and thus, it is obvious to those skilled in the art that the embodiments and technical terms can be carried out in other specific forms and changes without changing the technical idea or essential features. Therefore, it should be understood that simple modifications according to the embodiments of the present invention may belong to the technical spirit of the present invention.

What is claimed is:

1. A method for manufacturing an electronic component, comprising:

providing a plurality of sheets stacked upon one another, and to be laminated together, on a jig, wherein the jig has a plurality of recessed accommodation parts separated by a raised part;

laminating the plurality of sheets to form a laminate therefrom, the laminating including pressing the plurality of sheets against the jig such that a groove is formed in a surface of the laminate where the plurality of sheets overlaps with the raised part, forming a first insulation layer within the groove and on at least a portion of the surface of the laminate where the groove is formed;

dividing the laminate along the groove to form at least one main body part; and forming an electrode part on a first portion of a surface of the main body part created by the dividing, wherein the plurality of sheets includes a plurality of electric components arranged within respective unit areas, and wherein providing the plurality of sheets on the jig includes arranging the unit areas to overlap with respective accommodation parts of the jig.

2. The method of claim 1, wherein the raised part extends along two directions that cross one another.

3. The method of claim 1, wherein the plurality of sheets comprise a first body sheet, a coil pattern sheet having a plurality of coil patterns, and a second body sheet, and the coil pattern sheet is laminated so that the plurality of coil patterns overlap the accommodation part.

4. The method of claim 1, wherein pressing the plurality of sheets against the jig comprises pressing the plurality of sheets against the jig such that a portion of the laminate fills the accommodation parts.

5. The method of claim 2, wherein forming the first insulation layer includes forming the first insulation layer on the entire surface of the laminate where the groove is formed.

6. The method of claim 2, further comprising, before dividing the laminate, forming a second insulation layer on a surface of the laminate that is opposite to the surface of the laminate where the groove is formed.

7. The method of claim 6, further comprising, after dividing the laminate, forming a third insulation layer on a second portion of the surface of the main body part created by the dividing, wherein the second portion is outside the first portion.

8. The method of claim 5, wherein forming the electrode part comprises plating a surface of the cut laminate, and the method further comprises forming an insulation layer to cover the electrode part.

* * * * *